J. N. Pease,
Horse Power.
Nº 40,499.      Patented Nov. 3, 1863.
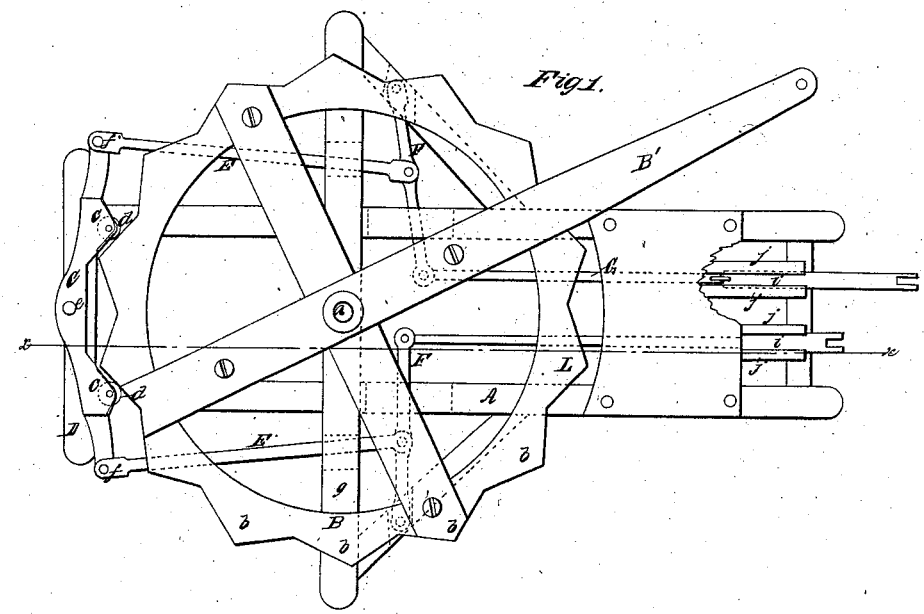
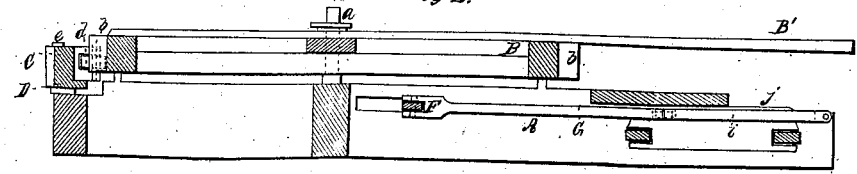
Witnesses.       Inventor.

UNITED STATES PATENT OFFICE.

JAMES N. PEASE, OF PANAMA, NEW YORK.

IMPROVEMENT IN HORSE-POWERS.

Specification forming part of Letters Patent No. 40,499, dated November 3, 1863.

*To all whom it may concern:*

Be it known that I, JAMES N. PEASE, of Panama, in the county of Chautauqua and State of New York, have invented a new and Improved Horse-Power; and I do hereby declare that the following is a full, clear, and exact description of the same, reference being had to the accompanying drawings, making a part of this specification, in which—

Figure 1 is a plan or top view of my invention; Fig. 2, a sectional view of the same, taken in the line $x$ $x$, Fig. 1.

Similar letters of reference indicate corresponding parts in the two figures.

This invention relates to a new and improved horse-power, designed for operating or transmitting power to that class of machines which work with a rectilinear reciprocating movement — such, for instance, as reciprocating saws, churn dashers, &c.

The invention consists in the employment or use of a wheel having a sweep attached to it, and its periphery provided with V-shaped teeth, with which a pallet engages, said pallet being attached to a lever which has rods connected to its ends, which rods are connected to other levers, the latter giving motion to rods which are connected to the device to be driven or operated.

To enable those skilled in the art to fully understand and construct my invention, I will proceed to describe it.

A represents a rectangular frame, which supports the working parts of the device.

B is a wheel, which works freely on an upright axis, $a$, attached to the frame A, and has a sweep, B', attached to it. To this sweep the horse or other animal is attached. The periphery of the wheel B is provided with V-shaped teeth $b$, which are shown clearly in Fig. 1.

C represents what may be termed a "pallet," the same being a short lever provided at each end with a V-shaped projection, $c$, in which a friction-roller, $d$, is fitted. This pallet C is attached to a lever, D, which is considerably longer than the pallet, the lever D being fitted on an upright fulcrum-pin, $e$, attached to the frame A and passing up through the center of both the lever and pallet.

To each end of the lever D there is attached by a pivot, $f$, a rod, E. These rods pass through slots in the ends of a cross-bar, $g$, in the frame A, and they are connected at their outer ends to levers F, which are secured in the frame A and have each a rod, G, connected to their ends. The ends of the rods G are connected at their outer ends by joints $h$ to slides $i$, which are fitted between guides $j$ on the frame A. To these slides $i$ the device to be driven is attached. The pallet C is placed at such a distance from the wheel B that the teeth $b$ of the latter will, as said wheel rotates, act upon the rollers $d$ and communicate a vibrating movement to the pallet C and lever D, and the slides $i$ will have a reciprocating movement imparted to them through the medium of the rods E, levers F, and rods G.

The arrangement, it will be seen, is extremely simple and efficient, occupies but a limited space, and may be constructed at a reasonable cost.

Having thus described my invention, what I claim as new, and desire to secure by Letters Patent, is—

The wheel B, provided with V-shaped teeth $b$, in combination with the pallet C, lever D, and the rods E G and levers F, or their equivalents, all arranged to operate substantially as and for the purpose herein set forth.

JAMES N. PEASE.

Witnesses:
WILLIAM WILTSE,
HENRY B. LAMMERS.